US010332230B2

(12) United States Patent
Metz et al.

(10) Patent No.: US 10,332,230 B2

(45) Date of Patent: Jun. 25, 2019

(54) CHARACTERIZING GPU WORKLOADS AND POWER MANAGEMENT USING COMMAND STREAM HINTING

(71) Applicant: QUALCOMM Incorporated, San Diego, CA (US)

(72) Inventors: Eduardus Antonius Metz, Unionville (CA); Song Zhao, Richmond Hill (CA); Navid Farazmand, Northborough, MA (US); Qiao Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

(21) Appl. No.: 14/840,915

(22) Filed: Aug. 31, 2015

(65) Prior Publication Data

US 2017/0061568 A1 Mar. 2, 2017

(51) Int. Cl.

*G06T 1/20* (2006.01)
*G06F 1/3234* (2019.01)

(Continued)

(52) U.S. Cl.

CPC ................ *G06T 1/20* (2013.01); *G06F 1/206* (2013.01); *G06F 1/3206* (2013.01);

(Continued)

(58) Field of Classification Search

CPC ......... G06T 1/20; G06T 15/005; G06T 15/80; G06T 2210/36; G06T 11/001; G06T 2210/52; G06T 1/60; G06T 2200/28; G06T 15/08; G06T 2200/08; G06T 2200/24; G06T 15/04; G06T 2200/16; G06T 17/10; G06T 19/20; G06T 15/10; G06T 15/405; G06T 2200/04; G06T 7/11; G06F 1/3243; G06F 3/0659; G06F 9/4443; G06F 13/102; G06F 1/08; G06F 3/044; G06F 9/5077; H04W 28/24; G09G 5/18;

(Continued)

(56) References Cited

U.S. PATENT DOCUMENTS 7,969,444 B1 6/2011 Biermann et al.
8,514,215 B2 8/2013 Cases et al.

(Continued)

FOREIGN PATENT DOCUMENTS

WO 2014131171 A1 9/2014

OTHER PUBLICATIONS

International Search Report and Written Opinion from International Application No. PCT/US2016/041743 dated Sep. 26, 2016, 12 pp.

(Continued)

*Primary Examiner* — Xilin Guo

(74) *Attorney, Agent, or Firm* — Shumaker & Sieffert, P.A.

(57) ABSTRACT

A method of graphics processing comprising receiving, at a graphics processing unit (GPU), a command stream, the command stream including one or more commands to be performed by the GPU and at least one command stream hint, the at least one command stream hint providing a characterization of a workload of the command stream, performing, by the GPU, a power management process based on the at least one command stream hint prior to executing the command stream, and executing, by the GPU, the command stream.

26 Claims, 5 Drawing Sheets

(51) Int. Cl.
*G06F 1/20* (2006.01)
*G06F 1/3206* (2019.01)
*G06F 9/50* (2006.01)

(52) U.S. Cl.
CPC .......... *G06F 1/3243* (2013.01); *G06F 9/5094* (2013.01); *Y02D 10/152* (2018.01)

(58) Field of Classification Search
CPC ............. G09G 2330/021; G09G 5/363; G09G 2352/00; G09G 2360/08; H04L 43/08
See application file for complete search history.

(56) References Cited

U.S. PATENT DOCUMENTS

| | | | | |
|---|---|---|---|---|
| 8,650,423 | B2 | 2/2014 | Li et al. | |
| 8,942,857 | B2 | 1/2015 | Anderson et al. | |
| 2012/0200576 | A1 | 8/2012 | Hartog et al. | |
| 2013/0106881 | A1* | 5/2013 | Hendry | G06T 1/20 345/522 |
| 2013/0155073 | A1 | 6/2013 | Khodorkovsky et al. | |
| 2013/0283073 | A1 | 10/2013 | Jeganathan et al. | |
| 2013/0321437 | A1* | 12/2013 | Hsieh | G06T 1/20 345/522 |
| 2014/0132334 | A1* | 5/2014 | Park | G11C 5/14 327/513 |
| 2014/0196050 | A1 | 7/2014 | Yu et al. | |
| 2015/0046674 | A1 | 2/2015 | Barry et al. | |
| 2015/0103085 | A1* | 4/2015 | Li | G06T 1/20 345/522 |
| 2016/0306678 | A1* | 10/2016 | Hira | G06F 9/5083 |
| 2016/0328333 | A1* | 11/2016 | Dong | G06F 12/02 |

OTHER PUBLICATIONS

Response to Written Opinion dated Sep. 26, 2016, from International Application No. PCT/US2016/041743 filed on Dec. 15, 2016, 21 pp.
Second Written Opinion issued in International Application No. PCT/US2016/041743 dated Apr. 4, 2017, 8 pp.
International Preliminary Report on Patentability of International Application No. PCT/US2016/041743 dated Jun. 28, 2017, 22 pp.

* cited by examiner

CHARACTERIZING GPU WORKLOADS AND POWER MANAGEMENT USING COMMAND STREAM HINTING

TECHNICAL FIELD

This disclosure relates to graphics processing, and more particularly, to workload characterization and power management techniques for a graphic processing unit (GPU).

BACKGROUND

Mobile devices are powered by batteries of limited size and/or capacity. Typically, mobile devices are used for making phone calls, checking email, recording/playback of a picture/video, listening to radio, navigation, web browsing, playing games, managing devices, and performing calculations, among other things. Many of these actions utilize a graphics processing unit (GPU) to perform some tasks. Example GPU tasks include the rendering of content to a display and performing general compute computations (e.g., in a general purpose GPU (GPGPU) operation). Therefore, the GPU is typically a large consumer of power in mobile devices. As such, it is beneficial to manage the power consumption of the GPU in order to prolong battery life.

SUMMARY

In general, the disclosure describes techniques for power management in a graphics processing unit (GPU). Techniques of this disclosure may include inserting command stream hints into a GPU command stream in order to characterize the workload represented by the command stream. A power management unit in the GPU may then use the command stream hints to perform power management processes before executing the command stream.

In one example, the disclosure describes a method of data processing, the method comprising receiving, at a GPU, a command stream, the command stream including one or more commands to be performed by the GPU and at least one command stream hint, the at least one command stream hint providing a characterization of a workload of the command stream, performing, by the GPU, a power management process based on the at least one command stream hint prior to executing the command stream, and executing, by the GPU, the command stream.

In another example, the disclosure describes an apparatus configured to process data, the apparatus comprising a GPU. The GPU comprises a front-end processor configured to receive a command stream, the command stream including one or more commands to be performed by the GPU and at least one command stream hint, the at least one command stream hint providing a characterization of a workload of the command stream, a power management unit configured to perform a power management process based on the at least one command stream hint prior to executing the command stream, and processing units configured to execute the command stream.

In another example, the disclosure describes an apparatus configured to process data the apparatus comprising means for receiving a command stream, the command stream including one or more commands to be performed by a graphics processing unit (GPU) and at least one command stream hint, the at least one command stream hint providing a characterization of a workload of the command stream, means for performing a power management process based on the at least one command stream hint prior to executing the command stream, and means for executing the command stream.

In another example, the disclosure describes a computer-readable storage medium storing instructions that, when executed, cause one or more processors of a device configured to process data to receive a command stream, the command stream including one or more commands to be performed by a graphics processing unit (GPU) and at least one command stream hint, the at least one command stream hint providing a characterization of a workload of the command stream, perform a power management process based on the at least one command stream hint prior to executing the command stream, and execute the command stream.

The details of one or more examples are set forth in the accompanying drawings and the description below. Other features, objects, and advantages will be apparent from the description, drawings, and claims.

DETAILED DESCRIPTION

Figure 1:
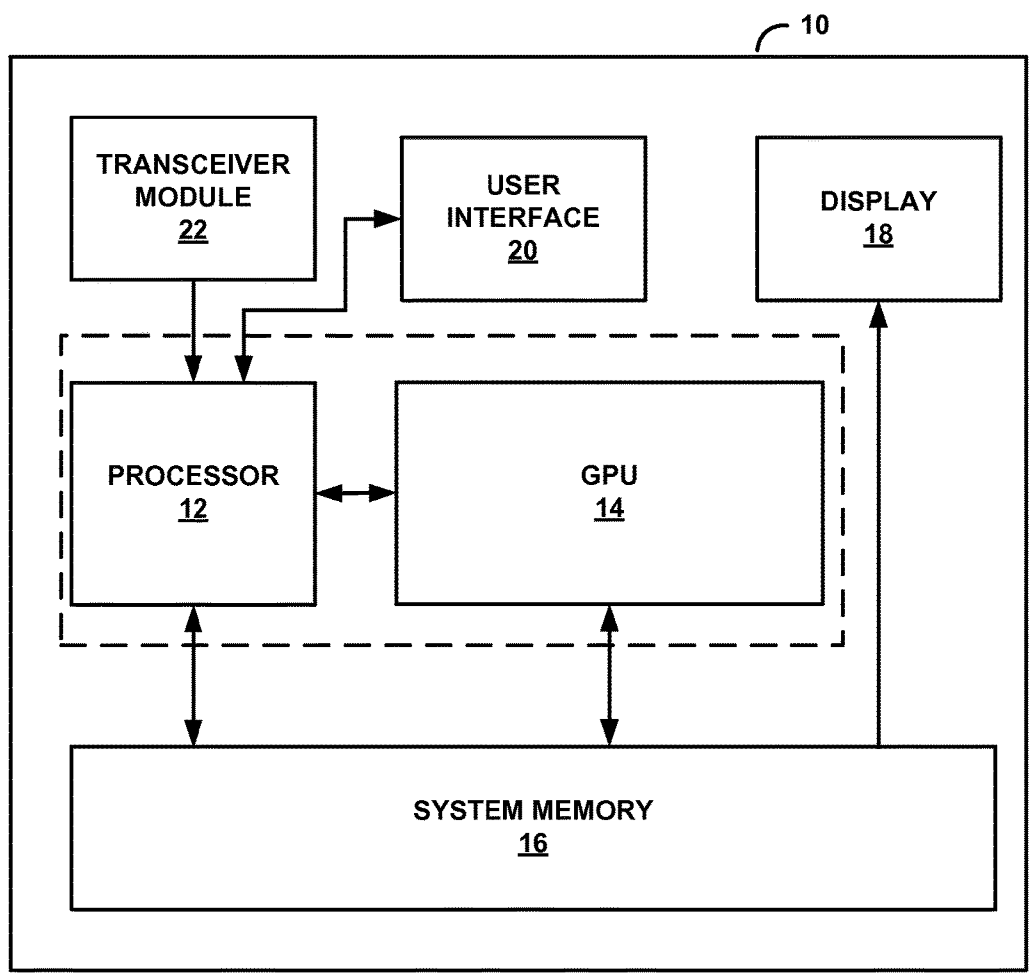
FIG. 1 is a block diagram illustrating an example device for processing data in accordance with one or more example techniques described in this disclosure.

This disclosure is directed to techniques for power management in a graphics processing unit (GPU). General examples of techniques for managing power consumption in GPU include graphics driver-based power management techniques and hardware-based (e.g. GPU-based) power management techniques.

In one example of graphics driver-based power management techniques, a graphics driver controls the operating voltage and/or operating frequency (e.g., clock rate) of the GPU and associated memory. In one example, the GPU driver may determine a GPU busy percentage (i.e., the time the GPU is busy compared to when the GPU is idle). The GPU busy percentage is then compared to one or more thresholds. Based on the comparisons, the graphics driver may raise or lower the power state (e.g., the operating voltage and/or operating frequency) of the GPU.

In one example of hardware-based power management techniques, a hardware unit in a GPU may be configured to power collapse (e.g., turn off) different groups of processing units of the GPU pipeline and/or adjust the power state of the GPU. The hardware block of the GPU responsible for power management may be referred to as a GPU Power Management Unit (GPMU). In one example, the GPMU may be configured to track a power budget. When that power budget is exceeded, the GPMU may be configured to reduce the power consumption of the GPU by power collapsing processing units in the GPU and/or reducing the power state of the GPU.

One drawback with the example power management techniques discussed above is the use of coarse-grained attributes of workload, e.g., GPU utilization or power budget. For example, conventional power management techniques that use information indicating GPU utilization history in a sliding window to forecast GPU utilization of incoming workloads may not be accurate for incoming workloads that are different than prior workloads. Oftentimes, past GPU utilization does not provide context awareness (e.g., information indicating the nature of the incoming workload), and may not be sufficient to identify specific performance and power requirements of the next incoming workload.

In accordance with examples of this disclosure, workload characterization may be used as one basis for power management in a GPU. Power management may be improved with an accurate characterization of workloads. That is, in accordance with the techniques of this disclosure, information indicating the context (i.e., a characterization of the work to be performed) may be used by a GPU to perform power management functions before a workload is processed by the GPU. In this way, a GPU using the techniques of this disclosure may achieve a finer-grained, more accurate power management for future workloads. In the examples described below, this disclosure describes techniques whereby hints that characterize an incoming workload are included in a command stream for that workload. A power management unit of the GPU may use the hints from the command stream to perform management techniques prior to execution of the command stream.

FIG. 1 is a block diagram illustrating an example device for processing data in accordance with one or more example techniques described in this disclosure. FIG. 1 illustrates device 10, examples of which include, but are not limited to, video devices such as media players, set-top boxes, mobile devices such as mobile telephones, personal digital assistants (PDAs), desktop computers, laptop computers, gaming consoles, video conferencing units, tablet computing devices, and the like.

In the example of FIG. 1, device 10 includes processor 12, GPU 14, and system memory 16. In some examples, such as examples where device 10 is a mobile device, processor 12 and GPU 14 may be formed as an integrated circuit (IC), such as a system-on-chip (SoC). For example, the IC may be formed as a processing chip within a chip package. In some examples, processor 12 and GPU 14 may be housed in different integrated circuits (i.e., different chip packages) such as examples where device 10 is a desktop or laptop computer with a separate graphics card that houses GPU 14. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general-purpose processing capabilities, and may be referred to as a general-purpose GPU (GPGPU) when implementing general-purpose processing tasks (e.g., so-called "compute" tasks).

For purposes of illustration, the techniques described in this disclosure are described with respect to GPU 14. However, the techniques described in this disclosure are not so limited. The techniques described in this disclosure may be extended to other types of processing units.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing. GPU 14 may be configured to perform 2D and/or 3D graphics processing In some non-graphics related compute examples, processor 12 may generate data that is better suited to be processed by GPU 14. Such data need not necessarily be needed for graphics or display purposes. For instance, processor 12 may output data on which matrix operations need to be performed to GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include DirectX® by Microsoft®, OpenGL® or OpenGL ES® by the Khronos group, and OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

System memory 16 may be the memory for device 10, and may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 is a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18.

Transceiver module 22 may include circuitry to allow wireless or wired communication between device 10 and another device or a network. Transceiver module 22 may include modulators, demodulators, amplifiers and other such circuitry for wired or wireless communication.

In the techniques described in this disclosure, a first processing unit (e.g., processor 12) offloads certain tasks to a second processing unit (e.g., GPU 14). To offload tasks, processor 12 outputs commands to be executed by GPU 14 and data that are operands of the commands (e.g., data on which the commands operate) to system memory 16 and/or directly to GPU 14. GPU 14 receives the commands and data, from processor 12 and/or from system memory 16, and executes the commands. In some examples, rather than storing commands to be executed by GPU 14, and the data operands for the commands, in system memory 16, processor 12 may store the commands and data operands in a local memory that is local to the IC that includes GPU 14 and processor 12 and shared by both processor 12 and GPU 14. In general, the techniques described in this disclosure are applicable to the various ways in which processor 12 may make available the commands for execution on GPU 14, and the techniques are not limited to the above examples.

In some examples, such as those where processor 12 stores commands to be executed by GPU 14 in memory (e.g., system memory 16 or a local memory), processor 12 may output memory address information identifying a group of commands that GPU 14 is to execute. The group of commands that GPU 14 is to execute is referred to as a command stream. In examples where processor 12 directly outputs the commands to GPU 14, the command stream includes those commands that processor 12 instructs GPU 14 to execute immediately.

There may be various ways in which processor 12 may group commands into command streams. As one example, a group of commands includes all the commands needed by GPU 14 to render one frame. As another example, a group of commands may be so-called "atomic commands" that are to be executed together without GPU 14 switching to other commands. Other ways to group commands into command streams that are submitted to GPU 14 may be possible, and the disclosure is not limited to the above example techniques.

In accordance with the techniques of this disclosure, as will be described in more detail below, processor 12 may be configured to include advisory hints (e.g., command stream hints) in a command stream. The command stream hints include information that provides a characterization of the future workload of GPU 14. As will be explained in more detail below, the command stream hints included in a command stream may include characterization information such as one or more of an indication of an application type, an indication of a context type, an indication of a render mode, an indication of a workload size, and/or an indication of a range of acceptable quality of service levels for future workload. In some examples, the command stream hints (e.g., the characterization information) may be included directly in the command stream. In other examples, the command stream hints in the command stream may comprise pointers, indices, or other indirect indications that inform GPU 14 of where to access the characterization information (e.g., in memory). GPU 14 (e.g., a power management unit of GPU 14) may be configured to retrieve the command stream hints from the command stream and perform a power management process based on the command stream hints before GPU 14 executes the command stream containing the command stream hints. The power management process may include one or more of power collapsing processing units of GPU 14, adjusting an operating voltage of a processing unit of GPU 14, adjusting an operating frequency, and/or performing any other technique or process that may be used to control the power consumption of GPU 14. Power collapsing a processing unit may involve cutting power off to a processing unit completely.

As such, according to one example of the disclosure, device 10 is an example of a device configured to generate one or more commands for execution by GPU 14, generate at least one command stream hint based on the one or more commands, the at least one command stream hint providing a characterization of a workload of the command stream, and generate a command stream to include the one or more commands and the at least one command stream hint. Device 10 may be further configured to receive, by GPU 14, the command stream, perform a power management process based on the at least one command stream hint prior to executing the command stream, and execute the command stream.

Figure 2:
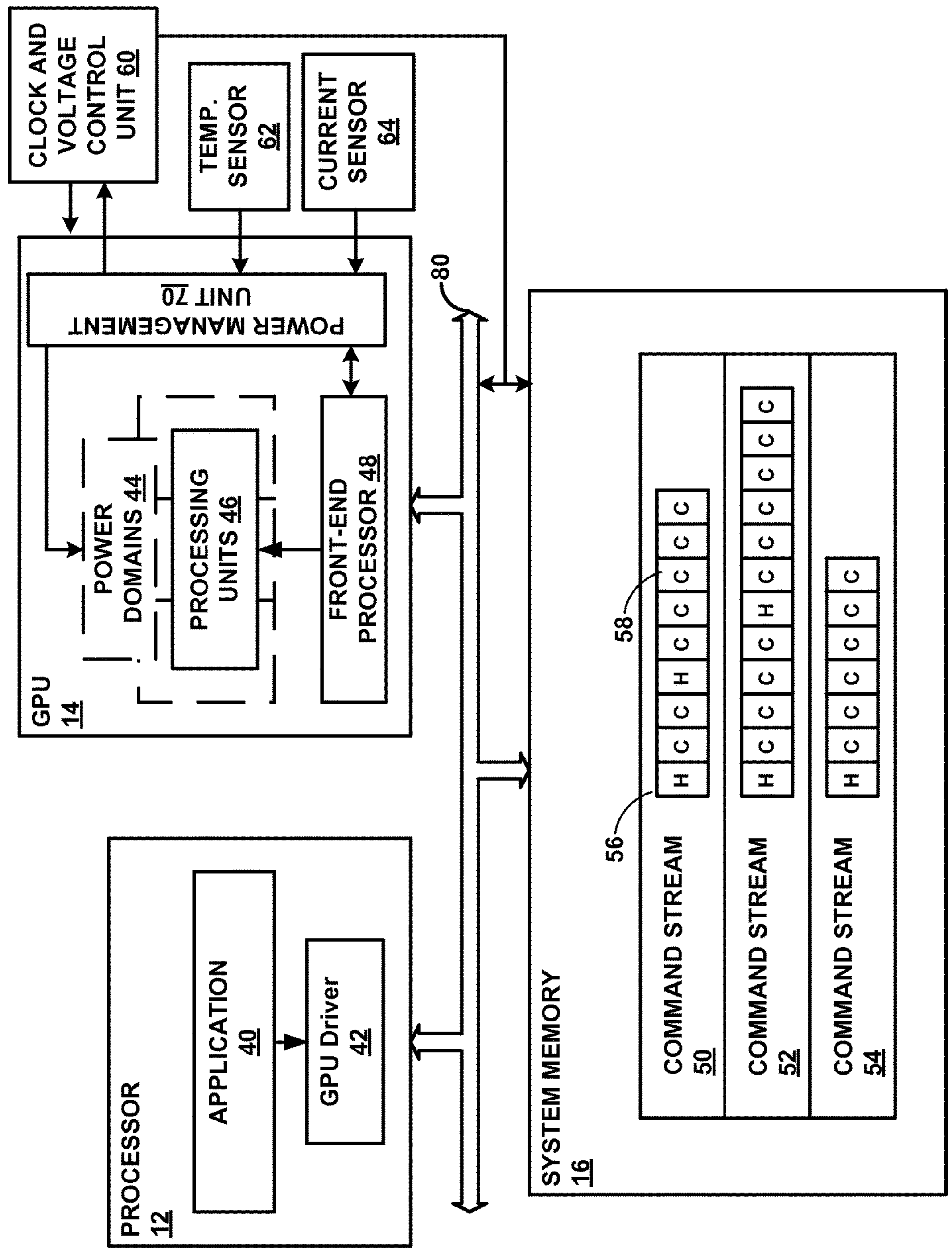
FIG. 2 is a block diagram illustrating components of the device illustrated in FIG. 1 in greater detail.

FIG. 2 is a block diagram illustrating components of the device illustrated in FIG. 1 in greater detail. As shown in FIG. 2, processor 12 may be configured to execute an application 40 and a GPU driver 42. Application 40 may be any application where execution by processor 12 causes one or more commands to be offloaded to GPU 14 for processing. Examples of application 40 may include an application that causes processor 12 to offload 3D rendering commands to GPU 14 (e.g., a video game application), an application that causes processor 12 to offload 2D rendering commands to GPU 14 (e.g., a user interface application), or an application that causes processor 12 to offload general compute tasks to GPU 14 (e.g., a GPGPU application).

As described above, processor 12 may offload tasks to GPU 14 due to the massive parallel processing capabilities of GPU 14. For instance, GPU 14 may be designed with a single instruction, multiple data (SIMD) structure. In the SIMD structure, processing unit 46 of GPU 14 may include a plurality of SIMD processing elements, where each SIMD processing element executes the same commands, but on different data.

A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 14 to perform many tasks in parallel (e.g., at the same time).

To avoid confusion, this disclosure uses the term "command" to generically refer to a process that is executed by processing units 46 of GPU 14. A command may include an actual command, constituent sub-commands (e.g., memory call commands), a thread, or other ways in which GPU 14 performs a particular function. Processing units 46 may includes one or more shader cores (e.g., programmable processing units including an arithmetic logic unit) or one or more units of fixed-function pipelines. In some examples, a portion (e.g., a power domain) of processing units 46 may be dedicated to 2D graphics processing, while another portion (e.g., a power domain) or processing unit 46 may be dedicated to 3D graphics processing.

Processor 12 may be configured to group two or more commands into command streams. FIG. 2 shows command streams 50, 52, and 54 stored in system memory 16. Command "C" 58 represents one command in command stream 50. In some examples, each of the command streams may represent a separate type of workload (e.g., 3D rendering, 2D rendering, compute task, etc.). In other examples, a command stream may include commands for two or more different types of workloads. In accordance with the techniques of this disclosure, processor 12 (e.g., through execution of GPU driver 42) may be configured to include command stream hints in the command stream. The command stream hints may be one or more syntax elements that characterize the workload of the command stream. Command stream hint(s) "H" 56 represents one or more command stream hints in command stream 50.

In some examples, the command stream hints H generated by GPU driver 42 characterize an attribute of the workload of a command stream. Example command stream hints include information (e.g., syntax elements) that indicate, among other things, an application type of the workload, a context type of a workload, a render mode of the workload, the size of the workload, and/or a range of acceptable quality of service (QoS) levels of the workload. As will be explained in more detail below, power management unit 70 of GPU 14 may use the command stream hints inserted into command streams 50, 52, and 54 to perform a power management process in advance of executing the particular command stream. In some examples, power management unit 70 may be implemented as a fixed function state machine. In other examples, power management unit 70 may be implemented as a combination of one or more fixed function hardware blocks working in combination with a programmable processor executing software and/or firmware. In other examples, power management unit 70 may be completely implemented as a processor executing software and/or firmware. Because the command stream hints characterize the incoming workloads, and thus provide an indication of the processing power needed for a particular command stream, GPU 14 is able to more effectively manage power in advance of processing workloads.

An application type command stream hint may be an indication (e.g., a syntax element) that indicates the type of application (e.g., application 40) that is offloading commands to be performed by GPU 14. Example application types include a user interface, video game, 2D rendering, 3D rending, compute applications (e.g., GPGPU applications) etc. The application type may be indicative of the amount of processing power needed to perform the workload and/or any timing requirements for completing the workload. For example, graphics applications (e.g., a user interface application, a game, etc.) may have strong requirements to complete a GPU task on time, and at a high frame rate in order to maintain a good user experience. For example, a graphics application may have a target frame rate deadline (e.g., in terms of frames per second (FPS)) by which a workload should be completed. A compute application, however, may have no such requirements. However, it is typically desirable to complete compute workloads as quickly as possible.

A context type command stream hint may indicate whether the workload represented by the command stream is for a graphics application (e.g., an application whereby one or more images are rendered and displayed) or a compute application (e.g., an application where GPU is used to make calculations and not necessarily display any images). In some examples, graphics applications may have higher power and timing (e.g., in terms of how quickly a workload must be completed) requirements than compute applications.

A render mode command stream hint may indicate the rendering mode for the workload. Such a command stream hint may be inserted when the context type command stream hint is a graphics context type. Example rendering modes include direct rendering and binning rendering (also-called tile-based rendering). Direct rendering is a rendering technique whereby the entirety of the frame is rendered at the same time. Binning rendering is a rendering technique whereby a frame is divided into sections (e.g., bins or tiles) and each section is rendered separately. In general, on a mobile device or any device with limited fast GPU memory (GMEM), direct rendering may be a slower, more power intensive operation as many accesses to system memory 16 may be made over bus 80.

A workload size command stream hint may indicate the size of the workload to be processed. For a graphics context type, the size command stream hint may indicate the size of a frame or surface to be rendered. For a compute context type, the size command stream hint may indicate the kernel size (i.e., generally the size of a matrix of numbers on which calculations are performed) for the compute workload. The larger the size of the workload, the larger the power requirement for GPU 14.

The range of acceptable QoS levels command stream hint may indicate a minimum and target FPS to be achieved for a graphics context type. The higher the minimum or target FPS, the higher the power requirement of GPU 14 to process the workload will be.

GPU driver 42 may be configured to determine one or more of the command stream hints described above from application 40, from a user setting, and/or from an analysis of the commands in command streams 50, 52, and 54. In one example, GPU driver 42 may be configured to determine command stream hints using an API monitoring process (e.g., by monitoring API calls made by application 40) and then insert the determined command stream hints into the bitstream. Additionally, in another example, GPU driver 42 may be configured to analyze the workload history, performance history, and/or QoS history of GPU 14 for a given application. Examples of workload history may include a running average busy and/or idle duration of GPU 14, an idle/busy ratio of GPU 14, a variance of the running average of the workload of GPU 14, and/or a trend of the running average of the workload of GPU 14.

Figure 3:
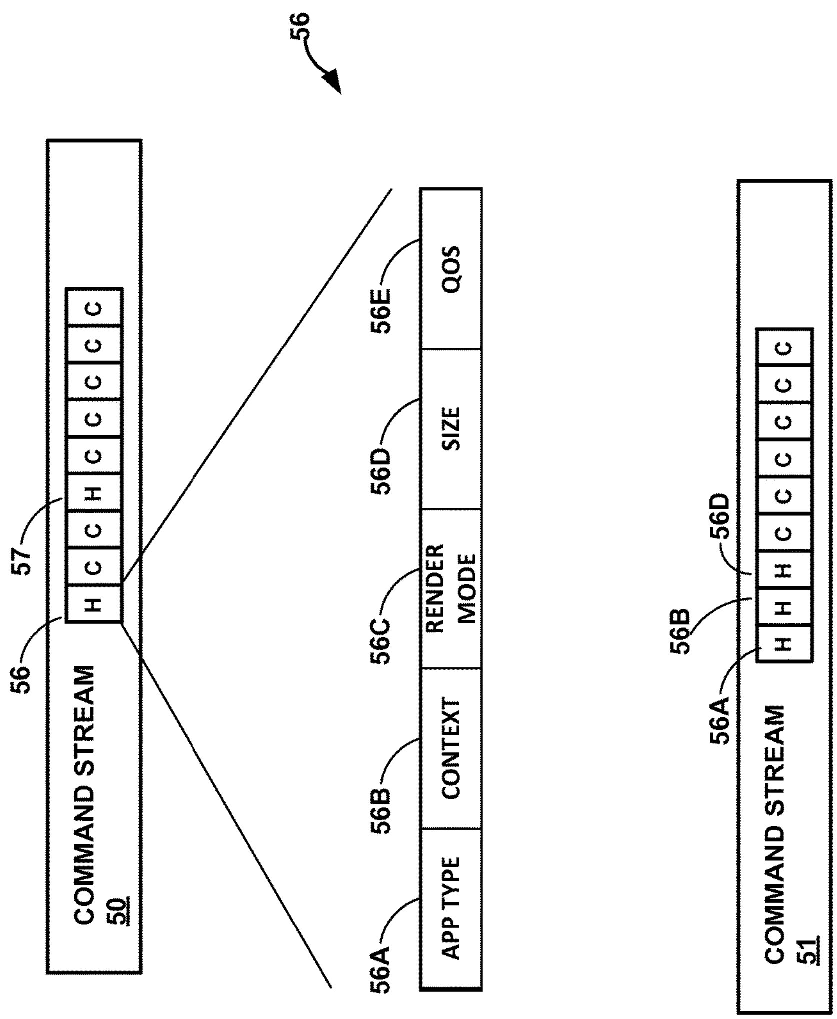
FIG. 3 is a conceptual diagram showing example command streams in accordance with the techniques of this disclosure.

FIG. 3 is a conceptual diagram showing example command streams in accordance with the techniques of this disclosure. FIG. 3 shows command stream 50 that may include command stream hints 56 and 57. In one example of the disclosure, command stream hint 56 may be related to the workload represented by all commands "C" that follow command stream hint 56 and precede the next command stream hint in command stream 50 (e.g., command stream hint 57). Command stream hint 57 may then apply to the workload represented by all command "C" that follow command stream hint 57 and precede the next command stream hint in the command stream. In some examples, command stream 50 may only have one command stream hint, or set of command stream hints, for the entire command streams. In other examples, a command stream may include multiple, different workloads, and each workload may have its own related command stream hint or sets of command stream hints.

In one example of the disclosure, command stream hint 56 may be in the form of a data structure that includes fields for multiple different types of command stream hints. In the example of FIG. 3, command stream hint 56 may be a data structure that includes fields for storing indications (e.g., syntax elements) of application type, context, render mode, size, and/or QoS, as discussed above. For example, command stream hint may include an app type field 56A, a context field 56B, a render mode field 56C, a size field 56D, and a QOS field 56E. In some examples, each of the fields may be present in the data structure of command stream hint 56 regardless of whether GPU driver 42 generates an indication for a particular field. For example, GPU driver 42 may be configured to insert a syntax element into each of fields 56A-E, the value of each respective syntax element representing a characteristic of the workload.

In other examples, GPU driver 42 may be configured to only insert the specific command stream hints that are relevant to a particular workload of the command stream. That is, rather than including command stream hints in a fixed data structure, GPU driver 42 may include one or more individual indications (e.g., syntax elements) for the command stream hints that characterize a given workload. For example, GPU driver 42 may be configured to insert a subset of command stream hints, e.g., one or more of 56A (application type), 56B (context), and 56D (size), e.g., all or less than all of the command stream hints, in command stream 51 of FIG. 3. That is, GPU driver 42 need not insert all possible types of command stream hints in every command stream. In some situations, some types of command stream hints may not be applicable for some workloads. For example, a render mode command stream hint would not be needed for a compute workload, as a compute workload does not involve rendering. In this case, the render mode command stream hint could be omitted from the command stream.

Returning to FIG. 2, after processor 12 stores the generated commands and command stream hints in system memory 16, processor 12 makes available the commands for execution by GPU 14. For instance, processor 12 communicates to GPU 14 the memory addresses of a set of the stored commands and their operand data, where GPU 14 is to execute the set of commands, and information indicating when GPU 14 is to execute the set of commands. In this way, processor 12 submits commands to GPU 14 for execution.

As illustrated in FIG. 2, processor 12 may also execute GPU driver 42. In addition to inserting command stream hints into command streams 50, 52, and 54, GPU driver 42 may be configured to provide a mechanism for processor 12 and GPU 14 to communicate with one another. For instance, when processor 12 offloads graphics or non-graphics (e.g., compute) processing tasks to GPU 14, processor 12 offloads such processing tasks to GPU 14 via GPU driver 42. For example, when processor 12 outputs information indicating the amount of commands GPU 14 is to execute, GPU driver 42 may be the unit of processor 12 that outputs the information to GPU 14.

GPU driver 42 may be configured in accordance with an application processing interface (API); although GPU driver 42 does not need to be limited to being configured in accordance with a particular API. In an example where device 10 is a mobile device, GPU driver 42 may be configured in accordance with the OpenGL ES API. The OpenGL ES API is specifically designed for mobile devices. In an example where device 10 is a non-mobile device, GPU driver 42 may be configured in accordance with the OpenGL API.

When a command stream (e.g., command streams 50, 52, and/or 54) are made available to GPU 14 for processing, front-end processor 48 may be configured to access a command stream from system memory 16 via bus 80. Front-end processor 48 may also retrieve the operand data for the commands from system memory 16 or directly from processor 12. Front-end processor 48 may determine which commands are to be executed by particular portions of processing units 46.

In accordance with the techniques of this disclosure, front-end processor 48 may be configured to parse command stream 50 and communicate, or otherwise make available, command stream hint(s) 56 to power management unit 70. Power management unit 70 may be configured to read the indications in command stream hint(s) 56 and perform a power management process for GPU 14 based on the command stream hint 56 prior to processing unit 46 of GPU 14 executing the commands in the command stream.

In the context of this disclosure, a power management process is any process that is used to control the power usage of GPU 14. Controlling power usage may include any of decreasing current power usage relative to past power usage, increasing current power usage relative to past power usage, or maintaining the current power usage at the same level as past power usage. In some non-limiting examples of this disclosure, power management unit 70 may be configured to perform a power management process by adjusting (i.e., either increasing or decreasing) an operating voltage level of one or more power domains of GPU 14, adjusting (i.e., either or increasing or decreasing) an operating clock frequency of one or more power domains of GPU 14, and/or power collapsing (e.g., shutting off power) to one or more power domains of GPU 14. Any power domain of GPU 14 to which operating voltage and/or operating frequency may be adjusted, or which may be power collapsed may be referred to as a collapsible power domain. In other examples, power management unit 70 may be configured to request operating voltage and/or operating frequency adjustments to one or more of bus 80 and system memory 16 based on the command stream hints.

Power management unit 70 may be configured to adjust one or more of the operating voltage or the operating clock frequency of GPU 14, or individual power domains 44 of GPU 14, by controlling the output of clock and voltage control unit 60. Clock and voltage control unit 60 may be responsible for regulating the operating voltage and/or operating clock frequency of GPU 14. Power management unit 70 may be configured to control the output of clock and voltage control unit 60, and/or otherwise instruct clock and voltage control unit 60, such that the operating voltage and/or operating clock frequency of one or more power domains 44 of GPU 14 are altered.

The rate (e.g., the clock frequency) at which processing units 46 execute commands may affect the power consumption of GPU 14. For example, if the operating clock frequency output by clock and voltage control unit 60 is relatively high, processing units 46 may execute more commands within a time period as compared to the number of processing units 46 that execute for a relatively low operating clock frequency. However, the power consumption of GPU 14 may be greater in instances where processing units 46 are executing the increased amount of commands. In general, power consumption of GPU 14 is lower when the operating clock frequency is lower. In some examples, the operating clock frequency of processing units 46 may be lowered by lowering the operating voltage of processing units 46. In other examples, clock and voltage control unit 60 may be configured to independently control the operating voltage and operating clock frequency of GPU 14. Additionally, a lower operating voltage may result in less current draw, and thus, less heat produced by GPU 14. Heat may cause the performance of GPU 14 to degrade. Consequently, lower operating voltages may be desirable in situations where excess heat is detected. Lowering the power consumption of GPU 14 to reduce heat buildup may be referred to as thermal mitigation.

In other examples of the disclosure, power management unit 70 may be configured to "vote" for operating voltage and/or operating frequency adjustments to one or more of bus 80 and/or system memory 16 based on the command stream hints. In this context, a "vote" for an operating voltage and/or operating frequency adjustment is a request to make such an adjustment sent from power management unit 70 to clock and voltage control unit 60. In some examples, the "vote" (or request) from power management unit 70 may directly control how and when clock and voltage control unit 60 makes operating voltage and/or operating frequency adjustments to bus 80 and system memory 16. In other examples, the "vote" (or request) from power management unit 70 may be one of many factors used by clock and voltage control unit 60 to make adjustments to the operating voltage and/or operating frequency adjustments of bus 80 and system memory 16. In some examples, the power usage of a particular workload may be lowered by lowering the operating voltage and/or operating frequency adjustments of bus 80 and/or system memory 16 such that data and commands are received by GPU 14 at a slower rate. In other examples, the workload efficiency (e.g., in terms of a reduction in idle time) of GPU 14 may be increased by increasing the operating voltage and/or operating frequency adjustments of bus 80 and/or system memory 16 such that data and commands are received by GPU 14 at a faster rate.

In the example of FIG. 2, processing unit 46 of GPU 14 may be divided into one or more power domains 44. An individual power domain of power domains 44 refers to a group of processing units 46 whereby power management unit 70 is able to perform a power management process independently of other power domains. That is, power management unit 70 may be configured such that a power management process may be performed on one power domain of power domains 44 without necessarily also performing the same power management process on all other power domains 44. Power management unit 70 is configured to perform power management processes on each power domain individually, on a subset of power domains, and/or on all power domains collectively.

It should be understood that power management unit 70 may be configured to receive, analyze, and use command stream hint(s) 56 in a manner to execute a power management process before executing the command stream 50. That is, the characterization of the workload represented by command stream hint(s) 56 do not necessarily prescribe a specific course of action to be taken by power management unit 70. Power management unit 70 may use command stream hint(s) 56 alone to determine how to manage the power consumption of GPU 14, or may use command stream hint(s) 56 in combination with other factors. Some non-limiting examples of how power management unit 70 may use command stream hint(s) are described below.

In one example, GPU 14 may receive command stream 54 that is a composition workload (i.e., the combination of one or more images) within a stand-alone 2D or 3D graphics command stream having a minimum QoS requirement. In this example, GPU driver 42 may include an application type, context type, and QoS command stream hint within command stream hint(s) 56. For example, with reference to FIG. 3, GPU driver 42 may include an indication of a composition application in app type field 56A, an indication of a graphics context in context field 56B, and an indication of the minimum QoS (e.g., in terms of minimum FPS) in QoS field 56E. In this example, power management may use the command stream hints along with temperature data from temperature sensor 62 and/or current data from current sensor 64 to perform a power management process to aid in thermal mitigation.

Typically, thermal mitigation presents a challenging problem. Temperature and current leakage take priority over performance when GPU 14 is in a thermal throttle mode (e.g., a mode where GPU operating voltage and/or operating clock frequency are lowered to limit temperature). However, thermal mitigation may impact QoS. Ideally, a user interface (e.g., from a composition workload) being rendered by GPU 14 should remain responsive and free of stutter. In order to reduce active power while delivering adequate composition QoS, power management unit 70 may be configured to make tradeoffs between thermal mitigation and QoS. One approach is to keep composition workloads, such as those represented by the workload of the current example, at a relatively higher operating clock frequency and operating voltage to help ensure the minimum QoS is met.

Power management unit 70 may use the command stream hints of this example to correctly identify a composition workload (e.g., a user interface) and cause clock and voltage control unit 60 to set an adequate operating clock frequency and operating voltage to meet the minimum QoS. Power management unit 70 may then use command stream hints that identify other types of workloads to then cause clock and voltage control unit 60 to lower the operating clock frequency and operating voltage to meet any thermal mitigation requirements. In this way, thermal mitigation is maintained for all workloads but those with a minimum QoS requirement.

In another example, next generation graphics APIs allow applications to use a single API for both graphics and compute workloads. That is, both graphics and compute workloads may be present in a single command stream. In this example, power management unit 70 may use context field 56B and render mode 56C to identify compute and graphics workloads within the same command stream. Graphics and compute workloads tend to have a different optimal operating clock frequency and a different operating voltage. Power management unit 70 may be configured to cause clock and voltage control unit 60 to set the operating clock frequency and the operating voltage based on whether the context field 56B indicates a graphics workload or a compute workload. Furthermore, for a graphics workload, power management unit 70 may be configured to cause clock and voltage control unit 60 to set the operating clock frequency and the operating voltage based on whether the render mode field 56C indicated direct rendering or binning rendering. In some examples, direct rendering may operate more efficiently with a higher operating voltage and/or operating clock frequency. In addition, certain power domains of processing units 46 can be power collapsed in case of compute workloads.

In another example, command stream hints may be used to identify workloads where a change in power management may not be necessary for an incoming workload. For instance, consider a 2D graphics workload. In this example, GPU driver 42 may include command stream hints in app type field 56A, context field 56B, and size field 56D. App type field 56A and/or context field 56B may indicate that the workload is 2D graphics. Size field 56D indicates the size of the job. In some examples, power management unit 70 may be configured to power collapse certain power domains of power domains 44 that include portions of processing unit 46 that are not used for 2D processing. However, if the size of the workload represented by the indication in size field 56D is not larger than some predetermined threshold, a power savings that may be realized by power collapsing a portion of processing units 46 may be largely lost due to the power needed to restart such power domains. That is, if the 2D graphics workload is small enough, only a negligible amount or no amount of power may be saved by power collapsing a portion of processing unit 46. Accordingly, power management unit 70 may be configured to only power collapse portions of processing unit 46 for 2D graphics workloads if the size of the workloads is greater than some threshold.

It should be understood that power management unit 70 may make determinations on which power management processes to perform using information in addition to the command stream hints described in this disclosure. As discussed above, power management unit 70 may also be configured to perform thermal mitigation power management processes based on input from temperature sensor 62 and current sensor 64. In addition, power management unit 70 may use past GPU performance metrics as another input in determining what power management process to perform.

For example, power management unit 70 may maintain running statistics of the workload of GPU 14. For instance, power management unit 70 may maintain one or more of a running average busy and/or idle duration, an idle/busy ratio, a variance of the running average, and a trend of the running average of the workload. Based on the statistics of the workload of GPU 14, as well as the command stream hints described above, power management unit 70 may continuously determine the operating voltage and/or operation clock frequency to be output by clock and voltage control unit 60.

It should also be understood that GPU 14, including power management unit 70, may be configured to perform a power management process using the command stream hints either in relative terms or in relation to a current power level. That is, a certain combination of command stream hints may cause power management unit 70 to adjust an operation voltage level, adjust an operating clock frequency, and/or power collapse power domains 44 without reference to a current power state (e.g., in terms of operation voltage level, operating clock frequency, and power state of power domains 44).

However, in other examples, that GPU 14, including power management unit 70, may be configured to perform a power management process using the command stream hints such that a particular pre-defined power state is achieved. A pre-defined power state may be defined by a particular operating voltage, a particular operating clock frequency, and a particular state of power collapse for one or more power domains 44. In this regard, if the pre-defined power state for a future workload, as indicated by the command stream hints, is the same as the current state for a current workload, the power management process performed by power management unit 70 may amount to no change in the current power state. In this example, changes in the current power state for a future workload characterized by the command stream hints may only occur if the future power state is desired to be different than the current power state. As such, making no change to the operating voltage, operating clock frequency, or power collapse of state of power domains 44 may be considered to be one type of a power management process.

In summary, the techniques and structures for generating and using command stream hinting described above may be an effective technique for describing fundamental GPU workload characteristics, with little additional driver overhead. In addition, command stream hinting may provide a predictive capability to overall workload changes. Command stream hinting may aid power management unit 70 in GPU 14 to detect workload changes proactively, and make power management decisions prior to workload execution, improve the overall GPU 14 power profile, and better balance QoS with thermal ramps and peak current consumption of GPU 14.

Figure 4:
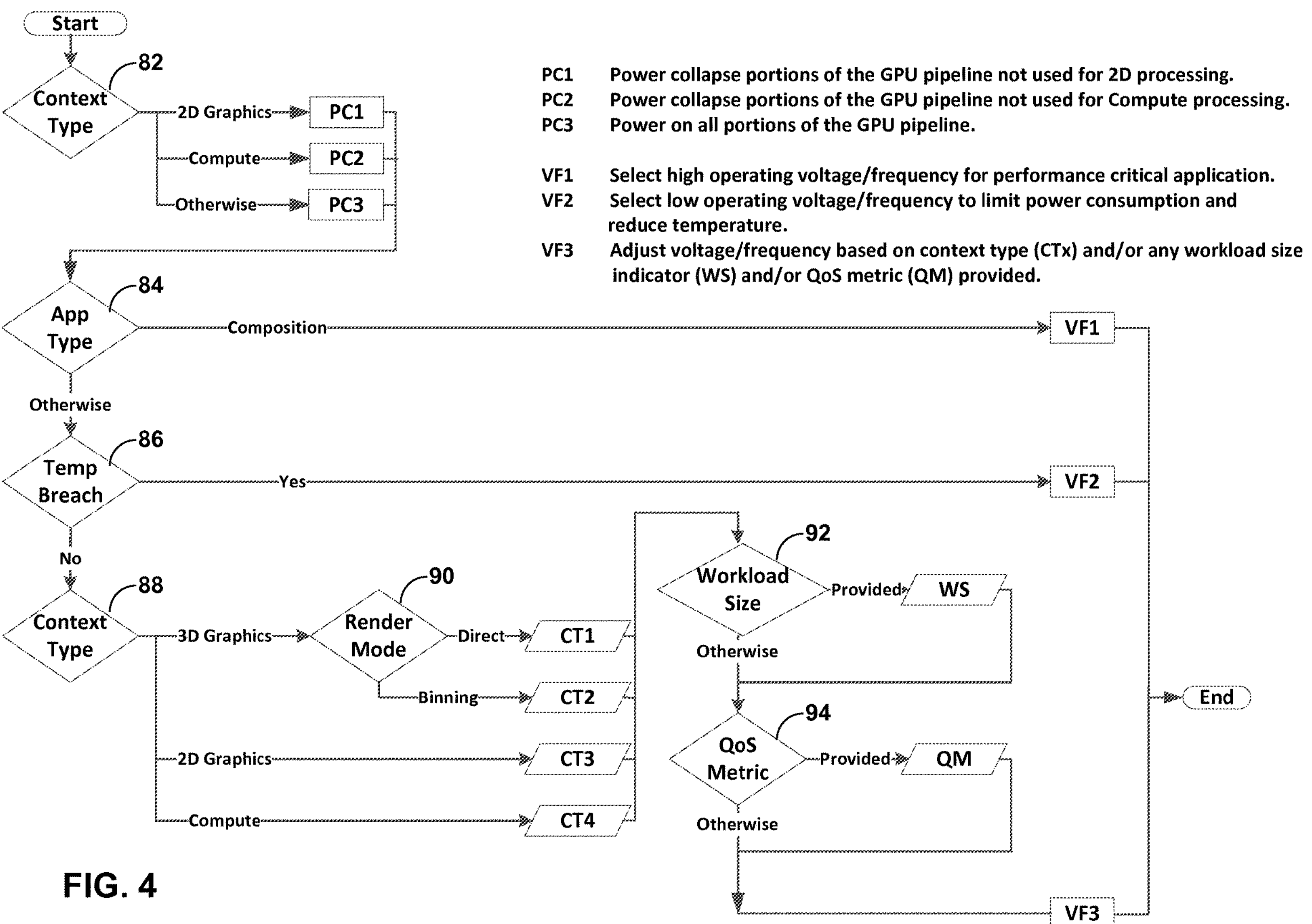
FIG. 4 is a flowchart illustrating example power management processes in accordance with the techniques of this disclosure.

FIG. 4 is a flowchart illustrating example power management processes in accordance with the techniques of this disclosure. In the example of FIG. 4, power management unit 70 may be configured to adjust the power state of GPU 14 into one of a plurality of pre-defined power states based on the command stream hints received and/or indicated by a command stream. Example pre-defined power states may include power states PC1, PC2, PC3, VF1, VF2, and VF3. In power state PC1, power management unit 70 power collapses portions of processing units 46 not used for 2D processing. In power state PC2, power management unit 70 power collapses portions of processing units 46 not used for compute processing. In power state PC3, power management unit 70 does not power collapse any of processing units 46 (e.g., power is supplied to all of power domains 44).

In power state VF1, power management unit 70 sets the operating voltage and/or operating clock frequency to a pre-defined "high" level, e.g., for performance critical applications. In power state VF2, power management unit 70 sets the operating voltage and/or operating clock frequency to a pre-defined "low" level, e.g., to limit power consumption and/or to reduce the temperature of GPU 14. In power state VF3, power management unit 70 sets the operating voltage and/or operating clock frequency to a particular pre-defined level that may depend on one or more of the context type (CT1, CT2, CT3, CT4), workload size (WS), and/or QoS metric (QS) as indicated by the command stream hints.

In the example of FIG. 4, power management unit 70 may first determine a context type (82) as indicated by the command stream hints. A context type indicating 2D graphics may cause power management unit 70 to set power state PC1. A context type indicating a compute application may cause power management unit 70 to set power state PC2. A context type indicating anything other than 2D graphics or compute may cause power management unit 70 to set power state PC3.

Power management unit 70 may then determine an application type (84) as indicated by the command stream hints. An application type indicating composition may cause power management unit 70 to set power state VF1. For any other application type, power management unit 70 may then determine whether or not a temperature breach has occurred (86), e.g., as indicated by temperature sensor 62. A temperature breach may be any temperature measurement above a certain threshold. If a temperature breach has occurred, power management unit 70 may set power state VF2.

If a power breach has not occurred, power management unit 70 may then again refer to the context type (88) indicated by the command stream hints. Example context types may include 3D graphics, 2D graphics and compute. Power management unit 70 may assign 2D graphics workloads to context type 3 (CT3), and compute graphics workloads to context type 4 (CT4). Power management unit 70 may further determine a render mode (90) from the command stream hints for 3D graphics workloads. Power management unit 70 may assign 3D graphics workloads with a direct rendering mode to context type 1 (CT1), and assign 3D graphics workloads with a binning rendering mode to context type 2 (CT2).

After the context type has been determined, power management unit 70 may then determine a workload size metric (WS), if indicated by the command stream hints (92). Power management unit 70 may also determine a QoS metric (QM), if indicated by the command stream hints (94). Based on the context type, the workload size metric (if available), and the QoS metric (if available), power management unit 70 may set power state VF3.

Figure 5:
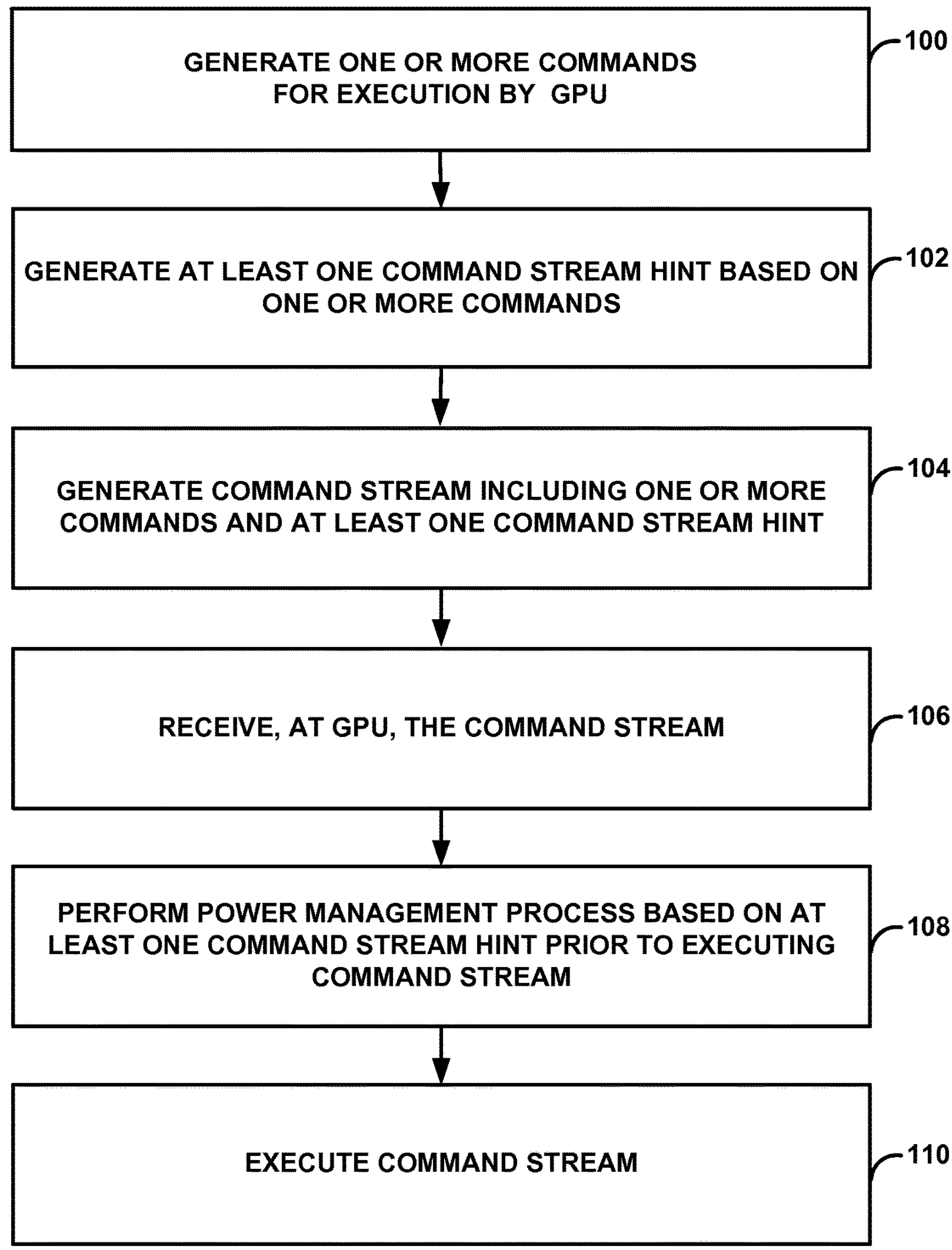
FIG. 5 is a flowchart illustrating an example method according to techniques described in this disclosure.

FIG. 5 is a flowchart illustrating an example method according to techniques described in this disclosure. The techniques of FIG. 5 may be implemented by one or more structures of processor 12 and GPU 14. In one example, processor 12 may be configured to generate one or more commands 58 for execution by GPU 14 (100), generate (e.g., through execution of GPU driver 42) at least one command stream hint 56 based on the one or more commands 58 (102), and generate command stream 50 to include one or more commands 58 and at least one command stream hint 56 (104). In one example of the disclosure, at least one command stream hint 56 includes one or more of an indication of an application type, an indication of a context type, an indication of a render mode, an indication of a workload size, or an indication of a range of acceptable quality of service levels.

Front-end processor 48 of GPU 14 may be configured to receive, at the GPU, command stream 50 (106). Command stream 50 includes one or more commands 58 to be performed by GPU 14 and at least one command stream hint 56. Command stream hint 56 provides a characterization of a workload of command stream 50. Power management unit 70 may be configured to perform a power management process based on at least one command stream hint 56 prior to executing the command stream 50 (108). Processing units 46 are configured to execute command stream 50 (110).

In one example of the disclosure, to perform the power management process, power management unit 70 is further configured to power collapse one or more power domains 44 of GPU 14 based on at least one command stream hint 56 prior to executing the command stream 50, wherein each respective power domain includes one or more of processing units 46. In another example of the disclosure, to perform the power management process, power management unit 70 is further configured to adjust an operating voltage level of one or more power domains 44 of GPU 14 based on at least one command stream hint 56 prior to executing command stream 50. In another example of the disclosure, to perform the power management process, power management unit 70 is further configured to adjust an operating clock frequency and/or operating voltage of one or more power domains 44 of the GPU 14 based on at least one command stream hint 56 prior to executing command stream 50.

In another example of the disclosure, to perform the power management process, power management unit 70 is further configured to perform the power management process based on at least one command stream hint 56 and an output of a temperature sensor 62 prior to executing the command stream 50. In another example of the disclosure, to perform the power management process, power management unit 70 is further configured to power collapse one or more power domains 44 of GPU 14 based on at least one command stream hint 56 indicating that the context type is a compute context type. In another example of the disclosure, to perform the power management process, power management unit 70 is further configured to lower (e.g., reduce) at least one of an operating voltage or an operating frequency of one or more power domains 44 of GPU 14 based on at least one command stream hint 56 indicating that a range of quality of service levels is below a threshold. In another example of the disclosure, to perform the power management process, power management unit 70 is further configured to power collapse one or more power domains 44 of GPU 14 based on at least one command stream hint 56 indicating that the context type is 2D graphics processing and that the workload size is above a threshold.

As used in this disclosure, the term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B" or "A is the same as B").

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of data processing, the method comprising:

receiving, at a graphics processing unit (GPU), a command stream, the command stream including a plurality of commands to be performed by the GPU and at least one command stream hint, the at least one command stream hint being information separate from the plurality of commands, the at least one command stream hint information providing a characterization of a workload of the plurality of commands of the command stream, and wherein the at least one command stream hint information includes one or more of an indication of an application type, an indication of a context type, an indication of a render mode, or an indication of a range of acceptable quality of service levels;

parsing the command stream, by a front-end processor of the GPU, to identify the at least one command stream hint;

sending, by the front-end processor of the GPU, the identified at least one command stream hint to a power management unit of the GPU;

performing, by the power management unit of the GPU, a power management process based on the at least one command stream hint prior to the GPU executing the command stream; and executing, by the GPU, the command stream.

2. The method of claim 1, further comprising:

generating, by a processor, the plurality of commands;

generating, by the processor, the at least one command stream hint based on the plurality of commands; and generating, by the processor, the command stream to include the plurality of commands and the at least one command stream hint.

3. The method of claim 1, wherein performing the power management process comprises:

power collapsing, by the power management unit of the GPU, one or more power domains of the GPU based on the at least one command stream hint prior to executing the command stream, wherein each respective power domain includes one or more processing units of the GPU.

4. The method of claim 1, wherein performing the power management process comprises:

adjusting, by the power management unit of the GPU, an operating voltage level of one or more power domains of the GPU based on the at least one command stream hint prior to executing the command stream, wherein each respective power domain includes one or more processing units of the GPU.

5. The method of claim 1, wherein performing the power management process comprises:

adjusting, by the power management unit of the GPU, an operating clock frequency of one or more power domains of the GPU based on the at least one command stream hint prior to executing the command stream, wherein each respective power domain includes one or more processing units of the GPU.

6. The method of claim 1, wherein performing the power management process comprises:

performing, by the power management unit of the GPU, the power management process based on the at least one command stream hint and an output of a temperature sensor prior to executing the command stream.

7. The method of claim 1, wherein performing the power management process comprises:

power collapsing, by the power management unit of the GPU, one or more power domains of the GPU based on the at least one command stream hint indicating that the context type is a compute context type, wherein each respective power domain includes one or more processing units of the GPU.

8. The method of claim 1, wherein performing the power management process comprises:

lowering, by the power management unit of the GPU, at least one of an operating voltage or an operating frequency of one or more power domains of the GPU based on the at least one command stream hint indicating that the range of quality of service levels is below a threshold, wherein each respective power domain includes one or more processing units of the GPU.

9. The method of claim 1, wherein performing the power management process comprises:

power collapsing, by the power management unit of the GPU, one or more power domains of the GPU based on the at least one command stream hint indicating that the context type is 2D graphics processing and that a workload size is above a threshold, wherein each respective power domain includes one or more processing units of the GPU.

10. An apparatus configured to process data, the apparatus comprising:

a memory configured to store a command stream; and a graphics processing unit (GPU), the GPU comprising:

a front-end processor configured to:

receive the command stream, the command stream including a plurality of commands to be performed by the GPU and at least one command stream hint, the at least one command stream hint being information separate from the plurality of commands, the at least one command stream hint information providing a characterization of a workload of the plurality of commands of the command stream, and wherein the at least one command stream hint information includes one or more of an indication of an application type, an indication of a context type, an indication of a render mode, or an indication of a range of acceptable quality of service levels;

parse the command stream to identify the at least one command stream hint; and send the identified at least one command stream hint to a power management unit of the GPU;

the power management unit configured to perform a power management process based on the at least one command stream hint prior to executing the command stream; and a plurality of processing units configured to execute the command stream.

11. The apparatus of claim 10, further comprising:

a processor configured to:

generate the plurality of commands;

generate the at least one command stream hint based on the plurality of commands; and generate the command stream to include the plurality of commands and the at least one command stream hint.

12. The apparatus of claim 11, wherein the processor is a central processing unit.

13. The apparatus of claim 10, wherein the GPU further comprises a plurality of collapsible power domains, each of the plurality of collapsible power domains including at least one of the plurality of processing units, and wherein the power management unit is further configured to:

power collapse one or more of the plurality of collapsible power domains based on the at least one command stream hint prior to executing the command stream.

14. The apparatus of claim 10, wherein the GPU further comprises a plurality of collapsible power domains, each of the plurality of collapsible power domains including at least one of the plurality of processing units, and wherein the power management unit is further configured to:

adjust an operating voltage level of one or more of the plurality of collapsible power domains based on the at least one command stream hint prior to executing the command stream.

15. The apparatus of claim 10, wherein the GPU further comprises a plurality of collapsible power domains, each of the plurality of collapsible power domains including at least one of the plurality of processing units, and wherein the power management unit is further configured to:

adjust an operating clock frequency of one or more of the plurality of collapsible power domains based on the at least one command stream hint prior to executing the command stream.

16. The apparatus of claim 10, wherein the power management unit is further configured to:

perform the power management process based on the at least one command stream hint and an output of a temperature sensor prior to executing the command stream.

17. The apparatus of claim 10, wherein the GPU further comprises a plurality of collapsible power domains, each of the plurality of collapsible power domains including at least one of the plurality of processing units, and wherein the power management unit is further configured to:

power collapse one or more of the plurality of collapsible power domains based on the at least one command stream hint indicating that the context type is a compute context type.

18. The apparatus of claim 10, wherein the GPU further comprises a plurality of collapsible power domains, each of the plurality of collapsible power domains including at least one of the plurality of processing units, and wherein the power management unit is further configured to:

lower at least one of an operating voltage or an operating frequency of one or more of the plurality of collapsible power domains based on the at least one command stream hint indicating that the range of quality of service levels is below a threshold.

19. The apparatus of claim 10, wherein the GPU further comprises a plurality of collapsible power domains, each of the plurality of collapsible power domains including at least one of the plurality of processing units, and wherein the power management unit is further configured to:

power collapse one or more of the plurality of collapsible power domains based on the at least one command stream hint indicating that the context type is 2D graphics processing and that a workload size is above a threshold.

20. The apparatus of claim 10, wherein the apparatus is a mobile device.

21. An apparatus configured to process data, the apparatus comprising:

means for receiving a command stream, the command stream including a plurality of commands to be performed by a graphics processing unit (GPU) and at least one command stream hint, the at least one command stream hint being information separate from the plurality of commands, the at least one command stream hint information providing a characterization of a workload of the plurality of commands of the command stream, and wherein the at least one command stream hint information includes one or more of an indication of an application type, an indication of a context type, an indication of a render mode, or an indication of a range of acceptable quality of service levels;

means for parsing the command stream to identify the at least one command stream hint;

means for sending the identified at least one command stream hint to a power management unit of the GPU;

means for performing a power management process based on the at least one command stream hint prior to executing the command stream; and means for executing the command stream.

22. The apparatus of claim 21, further comprising:

means for generating the plurality of commands;

means for generating the at least one command stream hint based on the plurality of commands; and means for generating the command stream to include the plurality of commands and the at least one command stream hint.

23. The apparatus of claim 21, wherein the means for performing the power management process comprises:

means for power collapsing one or more power domains of the GPU based on the at least one command stream hint prior to executing the command stream;

means for adjusting an operating voltage level of one or more power domains of the GPU based on the at least one command stream hint prior to executing the command stream; and means for adjusting an operating clock frequency of one or more power domains of the GPU based on the at least one command stream hint prior to executing the command stream, wherein each respective power domain includes one or more processing units of the GPU.

24. A non-transitory computer-readable storage medium storing instructions that, when executed, cause one or more processors of a device configured to process data to:

receive a command stream, the command stream including a plurality of commands to be performed by a graphics processing unit (GPU) and at least one command stream hint, the at least one command stream hint being information separate from the plurality of commands, the at least one command stream hint information providing a characterization of a workload of the plurality of commands of the command stream, and wherein the at least one command stream hint information includes one or more of an indication of an application type, an indication of a context type, an indication of a render mode, or an indication of a range of acceptable quality of service levels;

parse the command stream to identify the at least one command stream hint;

send the identified at least one command stream hint to a power management unit of the GPU;

perform a power management process based on the at least one command stream hint prior to executing the command stream; and execute the command stream.

25. The non-transitory computer-readable storage medium of claim 24, wherein the instructions further cause the one or more processors to:

generate the plurality of commands;

generate the at least one command stream hint based on the plurality of commands; and generate the command stream to include the plurality of commands and the at least one command stream hint.

26. The non-transitory computer-readable storage medium of claim 24, wherein the instructions further cause the one or more processors to:

power collapse one or more power domains of the GPU based on the at least one command stream hint prior to executing the command stream;

adjust an operating voltage level of one or more power domains of the GPU based on the at least one command stream hint prior to executing the command stream; and adjust an operating clock frequency of one or more power domains of the GPU based on the at least one command stream hint prior to executing the command stream, wherein each respective power domain includes one or more of processing units.

* * * * *